United States Patent
Schulze et al.

(10) Patent No.: US 7,464,587 B2
(45) Date of Patent: Dec. 16, 2008

(54) DEVICE FOR MONITORING AND WIRELESSLY INDICATING A PRESSURE OR A PRESSURE CHANGE IN PNEUMATIC TIRES MOUNTED ON VEHICLES

(76) Inventors: Gunter Schulze, Lutherstrasse 3, D-75228 Ispringen (DE); Michael Frank, Am Roßlauf 6, D-75015 Bretten (DE)

( * ) Notice: Subject to any disclaimer, the term of this patent is extended or adjusted under 35 U.S.C. 154(b) by 0 days.

(21) Appl. No.: 10/557,675

(22) PCT Filed: May 19, 2004

(86) PCT No.: PCT/EP2004/005422

§ 371 (c)(1),
(2), (4) Date: Apr. 13, 2006

(87) PCT Pub. No.: WO2004/103740

PCT Pub. Date: Dec. 2, 2004

(65) Prior Publication Data
US 2006/0273889 A1    Dec. 7, 2006

(30) Foreign Application Priority Data
May 20, 2003   (DE) ............................... 103 23 631

(51) Int. Cl.
*G01M 17/02*   (2006.01)
(52) U.S. Cl. ..................................................... 73/146
(58) Field of Classification Search ........ 73/146–146.8; 340/442–447
See application file for complete search history.

(56) References Cited

U.S. PATENT DOCUMENTS

| | | | | | |
|---|---|---|---|---|---|
| 4,193,063 | A | * | 3/1980 | Hitt et al. ................ | 340/870.37 |
| 5,532,526 | A | * | 7/1996 | Ricco et al. .................. | 307/104 |
| 5,563,479 | A | * | 10/1996 | Suzuki ........................ | 318/139 |
| 5,708,411 | A | * | 1/1998 | Hill ............................. | 340/447 |
| 6,218,937 | B1 | * | 4/2001 | Delaporte .................... | 340/447 |

FOREIGN PATENT DOCUMENTS

| | | |
|---|---|---|
| DE | 199 39 936 A1 | 8/1999 |
| DE | 101 30 035 A1 | 2/2002 |
| EP | 0 016 991 | 3/1980 |

OTHER PUBLICATIONS

Norman, N.: Reifendruck-Kontrollsystem für alle Fahrzeugklassen. ATZ Automobiltechnische vol. 102, No. 11/2000, pp. 950 to 956.

\* cited by examiner

*Primary Examiner*—Andre J. Allen
*Assistant Examiner*—Jermaine Jenkins

(57) ABSTRACT

A device for monitoring and wirelessly signaling a pressure, or a change in pressure, in pneumatic tires on vehicles having a pressure sensor for measuring the pressure or the change in pressure; a transmitter for transmitting a signal derived from the measuring signal of the pressure sensor; a control circuit that activates the transmitter only from time to time; a battery (1) as current source; and a back-up capacitor connected in parallel to the battery. A controllable switching unit is provided by means of which the back-up capacitor can be connected in parallel to the battery from time to time for a limited period of time only.

20 Claims, 1 Drawing Sheet

DEVICE FOR MONITORING AND WIRELESSLY INDICATING A PRESSURE OR A PRESSURE CHANGE IN PNEUMATIC TIRES MOUNTED ON VEHICLES

BACKGROUND OF THE INVENTION

1. Field of the Invention

The invention relates to a device for monitoring and wirelessly signaling a pressure or a change in pressure in pneumatic tires on vehicles.

2. Description of Related Art

A device for monitoring and wirelessly signaling a pressure or a change of pressure in pneumatic tires on vehicles, where a pressure sensor, a transmitter, a control circuit and a battery are combined in a unit referred to as "wheel electronics", which is mounted on the rim well of the respective vehicle wheel, has been disclosed by ATZ Automobiltechnische Zeitschrift, Vol. 102, No. 11/2000, pp. 950 to 956. The wheel electronics are mounted in a housing and are then potted so that the no access to, and no change of, the battery is possible. Consequently, the service life of the wheel electronics mounted on the respective wheel is limited by the battery life. It is, therefore, important that current consumption be kept as low as possible so as to achieve the longest possible service life for the battery and, in parallel to that, for the wheel electronics.

Instead of operating the wheel electronics continuously, one therefore effects pressure measurements at predetermined time intervals only, and the pressure values obtained typically are not transmitted every time a measurement is made, but rather from time to time only, for example once per minute. Between the different measuring operations, the wheel electronics are caused to assume a power-saving condition. It is the transmitting operation that momentarily consumes the greatest amount of energy. It loads the battery with a current pulse that may lead to an internal voltage drop in the battery. In an extreme case, the voltage may drop so far that regular operation of the electronic circuits supplied by the battery is no longer guaranteed. This risk exists not only, but especially, with aged batteries: Even if the battery has not reached the end of its service life, but still contains some residual charge, ageing combined with the associated passivation may result in increased internal resistance of the battery. And cold temperatures also increase the internal resistance of batteries; every driver of a car knows that the vehicle battery looses capacity in winter so that eventually it may no longer be in a position to function properly, especially if it is already aged, when the temperature drops below a given limit.

Further, U.S. Pat. No. 6,218,937 B1 discloses a device having the features of the preamble of Claim 1, which comprises, in addition to the battery, a back-up capacitor intended to ensure that the transmitter will be adequately supplied with power. However, such a back-up capacitor reduces the service life of the battery.

DE 101 30 035 A1 describes a device having the features of the preamble of Claim 1, except for the back-up capacitor. The described device comprises a control switch for controlling the excitation of components of the transmitter module. The control switch comprises an input, which is connected to the battery via a filter and/or a voltage regulator being neither described nor shown in detail.

SUMMARY OF THE INVENTION

Now, it is the object of the present invention to open up a way of improving the operating safety of the wheel electronics and of extending the period of time during which the system will safely operate, in spite of the influences of cold temperatures and ageing of the battery in wheel electronics.

This object is achieved by a device having the features indicated in Claim 1. Advantageous further developments of the invention are the subject-matter of the sub-claims.

The device according to the invention for monitoring and wirelessly signaling a pressure, or a change in pressure, in pneumatic tires on vehicles comprises a pressure sensor for measuring the pressure or the change in pressure, a transmitter for transmitting a signal derived from the measuring signal of the pressure sensor, a control circuit that activates the transmitter only from time to time, a battery as current source, a back-up capacitor and a controllable switching unit by which the back-up capacitor can be connected in parallel to the battery, the controllable switching unit comprising an input for control signals arriving from the control circuit, through which the back-up capacitor can be brought into circuit from time to time for a limited period of time only.

This arrangement provides substantial advantages:

- The use of a back-up capacitor, as provided by the invention, avoids interruptions of the function of the wheel electronics due to an unforeseeable, but also a foreseeable rise in internal resistance of the battery in the wheel electronics. While the fact that the voltage of a battery can be backed up by a capacitor connected in parallel to the battery has been known as such, uninterrupted backing-up of the battery voltage through the use of a capacitor would not be helpful in a system of the described kind and would, instead of extending the service life of the battery or the period of time during which it is supplied with sufficient power, even shorten that service life or period of time as due to its unavoidable leakage currents the back-up capacitor would contribute toward discharging the battery and would, thus, aggravate the problem which it is intended to solve. The invention solves this problem by providing, in combination with the back-up capacitor, a controllable switching unit by means of which the back-up capacitor can be connected in parallel to the battery from time to time and for a limited period of time only, the controllable switching unit preferably comprising for this purpose an input for control signals arriving from the control circuit of the wheel electronics through which the back-up capacitor can be brought into circuit from time to time for a limited period of time only. This permits the leakage currents unavoidably encountered on the back-up capacitor to be limited to such a short period of time that the advantage derived from the battery voltage being backed up will outweigh the disadvantage of the additional discharging occurring as a result of the unavoidable leakage currents of the back-up capacitor, the leakage current occurring in this case during a very short period of time only.
- The back-up capacitor ensures that the battery voltage, which due to ageing, cold temperatures or frequent transmitting operations might drop below its limit value down to which regular operation of the circuits is still guaranteed, will actually not drop below that limit value when being loaded by a power pulse.
- The invention not only permits an extended service life to be achieved for the battery of the wheel electronics, but also allows the use of batteries that otherwise would be unsuitable for use in wheel electronics because of the loading produced by power pulses in normal operation.

Preferably, the control circuit is designed in such a way as to connect the back-up capacitor shortly before it activates the transmitter so that the back-up capacitor will still reach the full voltage the slightly loaded battery can supply. On the other hand, the back-up capacitor should not remain charged for an unnecessarily long period of time in order to keep the amount of charging by leakage currents as low as possible. It is for that reason that the back-up capacitor should be charged only shortly before a power pulse is required for a transmitting operation. At the end of the transmitting operation, or shortly thereafter, most conveniently at the end of the transmitting operation, the back-up capacitor should be separated from the battery to ensure that it will not be charged earlier than necessary.

The back-up capacitor can be cut in every time shortly before the transmitter is activated by the control circuit. However, this need not be so under all circumstances, especially when the battery has not aged yet, when the temperature is not low and when the battery is not required to satisfy the power pulse demand at especially short time intervals. According to an advantageous further development of the invention, the control circuit is designed in such a way that it will bring the back-up capacitor into circuit not every time the transmitter is activated, but only if and when necessary—a criterion which the control circuit can determine according to given criteria. The control circuit is preferably provided for that purpose with a comparator circuit for determining whether or not a need exists to back up the battery.

A first criterion that may be used to determine whether or not a need exists to back up the battery consists in measuring the voltage of the battery itself. It is of advantage for this purpose if the control circuit is connected with a device for measuring the voltage of the battery and is designed in such a way that it determines the existence of such a need when the voltage of the battery has dropped below a given limit value. That limit value may be a minimum voltage required by the circuits in the wheel electronics to function properly. This further development of the invention provides the advantage that it provides a criterion that will indicate whether or not a need exists to back up the battery, regardless of the reasons that have led to the drop in battery voltage.

A second way consists in observing if the voltage has dropped below its limit value on the occasion of one or more preceding activations of the transmitter. If this is the case, the control circuit may cause the back-up capacitor to be brought into circuit for subsequent transmitting operations. That further development of the invention provides the advantage that it covers not only cases where the voltage drops below a limit value in the unloaded condition of the battery, but also cases where the voltage is sufficiently high in the unloaded condition of the battery, but has dropped below a limit value when loaded by a current pulse in normal operation so that there is a risk that the same situation may occur during subsequent transmitting operations as well.

A third possibility consists in connecting the control circuit to a temperature sensor and in designing it in such a way that it will determine that the battery needs to be backed up when the temperature drops below a limit value, which may be selected empirically and which according to previous experience gives reason to expect that the current pulse required for transmission might cause the battery voltage to drop below that limit value below which normal operation of the device no longer is guaranteed.

A fourth possibility consists in connecting the control circuit to a temperature sensor and in designing it in such a way that it will determine that the battery needs to be backed up when a predetermined period of time has lapsed since the timer has been started. It can be ensured in this way—preferably in combination with the determination that other criteria are met as well—that the back-up capacitor in any case will be cut in once the battery has reached a certain age. The timer conveniently is started during starting-up of the device on the occasion the latter is first mounted on a wheel.

A fifths possibility consists in connecting the control circuit with a counter which continuously counts the number of transmitting operation, and in designing the control circuit in such a way that it will determine that the battery needs to be backed up when a predetermined number of transmitting operations has been exceeded. This then makes it possible, independently of other criteria or in supplementation to the presence of other criteria, to generally connect the back-up capacitor during transmitting operations when the battery has supplied energy for a predetermined number of transmitting operations and when the discharge degree of the battery has reached a point where one can no longer be sure that the battery voltage will remain above the minimum value necessary for normal operation of the device when the next pulses occur during normal operation.

A sixth possibility consists in designing the control circuit in such a way that it will determine that the battery needs to be backed up when the measured pressure value is below a limit value. It can be ensured in this way that the next following transmitting operations will be safely performed—which is desirable for reasons of safety—regardless of other criteria, or in supplementation to other criteria, in any case when the measured pressure value drops below a limit value thereby signaling the existence of a risk.

A seventh possibility consists in designing the back-up capacitor in such a way that it will determine that the battery needs to be backed up when the variation of pressure over time exceeds a given limit value. This provides the advantage that in case of a rapid pressure drop—which should be signaled with high priority—it can be ensured, irrespective of other criteria that may influence the internal resistance of the battery, that sufficient voltage will be available for the next transmitting operations.

An eighth possibility consists in monitoring the transmitter and evaluating an information obtained from the transmitter with the aim to diagnose an attempted transmitting operation that failed. A transmitting operation that failed may be the result of successive loading of the battery by a current pulse. When failure of a transmitting operation is determined, then the back-up capacitor may be cut in for subsequent transmitting operations. Failure of an attempted transmitting operation can be determined, for example, by combining the control circuit with a voltage sensor that monitors the voltage of the transmitter after activation of the transmitter, and, if the voltage is below a given limit value, reports the voltage to the control circuit so that the latter will cut in the back-up capacitor before the next activation, and will preferably effect the next activation as quickly as possible.

The different possibilities explained above may be realized not only in isolation but also in combination, which considerably improves the safety of the tire pressure monitoring system.

Basically, the control circuit may be arranged to check the criterion or the criteria, which it uses to determine if a need exists to cut in the back-up capacitor, before every transmitting operation. It may, however, be more favorable, current-saving and efficient to arrange the control circuit so that once a need to back up the battery has been determined the back-up capacitor will be cut in for a given number of a plurality of transmitting operations, and the criterion or the criteria, that led to determination of that need, will be checked only after such given number of transmitting operations.

Preferably, the controllable switching unit is combined with a current limiter through which the back-up capacitor is charged, but not discharged. It can be ensured in this way that the charging current of the back-up capacitor will not cause the operating voltage to be reduced in an undesirably way. It is, however, ensured in this way that when the transmitter is then activated, and the current pulse is needed, the back-up capacitor can supply its charge as desired without being hindered by the current limiter. A switching unit especially well suited for this purpose comprises two switching elements, controlled by the control circuit, the first of which serves to cut in the back-up capacitor via the current limiter, while the second one serves to bridge the current limiter. A switching unit of this kind can be operated in such a way that during the charging phase of the back-up capacitor only the first switching element is in low-resistance condition, while the second switching element is in high-resistance condition. This prevents the battery from being overloaded by the charging current. The second switching element is transferred to the low-resistance condition only in the final charging phase when the current pulse is needed for the transmitting operation. One thereby avoids a voltage drop at the current limiter.

The switching unit preferably uses as switching elements field effect transistors, especially one or more MOSFETs, as these have a negligible leakage current only in high-resistance condition.

Generally, the control circuit, which according to the invention is used to control the controllable switching unit, is a component of the wheel electronics controlling also the sensors and the transmitter present in the wheel electronics. There is, however, also the possibility to have the controllable switching unit provided in the respective wheel electronics controlled by a central receiver and control unit provided in the vehicle, to which signals from the wheel electronics are transmitted by radio. Instead of initiating the measuring and transmitting operations in the wheel electronics through or together with a control circuit provided in the wheel electronics, there is then the possibility to initiate them by radio from the central receiver and control unit, by having the latter transmit corresponding interrogation and control signals to the respective wheel electronics by radio. It is, therefore, within the scope of the present invention that the control circuit, which controls the controllable switching unit, is not located in the wheel electronics, but rather in the central receiver and control unit and transmits its commands to the wheel electronics by radio. A tire pressure monitoring system, where the wheel electronics are controlled from a central receiver and control unit by radio, has been disclosed by DE 199 39 936 A1.

BRIEF DESCRIPTION OF THE FUGURES

One exemplary embodiment of the invention is illustrated diagrammatically in the attached drawings and will be described hereafter with reference to the drawings in which.

DETAILED DESCRIPTION OF THE INVENTION

Figure 1:
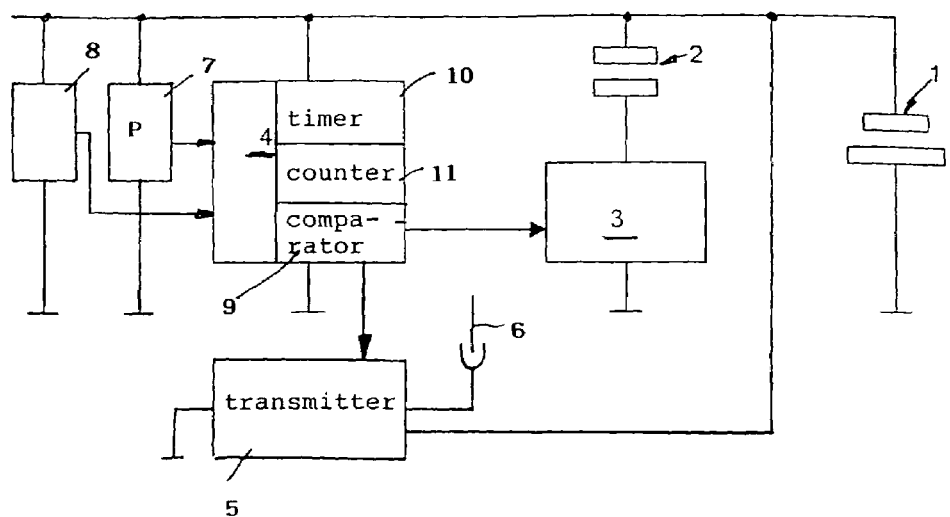
FIG. 1 shows a block diagram of a device according to the invention.

FIG. 1 shows a block diagram of the wheel electronics comprising a battery 1, a back-up capacitor 2, a controllable switching unit 3, a control circuit 4, a transmitter 5 and an antenna 6. Further, the wheel electronics comprise a pressure sensor 7 for supplying an electric output signal, for example a piezoelectric pressure sensor, and a further sensor 8.

The battery 1 supplies the current for the sensors 7 and 8, for the control circuit 4 and the transmitter 5. Preferably, the control circuit is an integrated circuit, for example an ASIC in which the sensors 7 and 8 may be integrated. Further, a comparator 9, a timer 10 and a counter 11 are integrated in the control circuit 4.

Using a clock derived from the base clock pulse of the control circuit 4 or from one of the sensors 7, 8 the control circuit 4 determines the time intervals at which the pressure sensor 7 and the sensor 8 are activated and the time intervals at which the transmitter 5 is activated. For example, the pressure sensor 7 may be activated every 3 seconds, the sensor 5 may be activated once per minute. When the control circuit 4, which contains the measured pressure values supplied by the pressure sensor 7 and which evaluates them using the comparator 9, determines that the pressure has dropped below a predetermined limit value, or determines that a rapid pressure drop occurs—which can be derived from the fact that the pressure variation between two successive pressure measurements exceeds a given value—then the control circuit 4 may activate the transmitter 5 more frequently, for example after every pressure measurement, in order to signal the rapid and, thus, dangerous variation of pressure to a receiver unit in the vehicle for the purpose of evaluating the measurement and signaling the result to the driver.

Reliable monitoring of the tire pressure requires that the transmitter 5, which momentarily represents the highest current load for the battery 1, is supplied with sufficient operating voltage. In order to ensure that this requirement is met, the control circuit 4 controls the switching unit 3 so that it is transferred to a low-resistance condition shortly before the transmitter 5 is activated, with the effect that the back-up capacitor 2 is then connected in parallel to the battery 1 and is charged up to a voltage which substantially conforms to the voltage of the battery 1 in unloaded condition. When the transmitter 5 is then activated a short time later, it can draw not only on the current from the battery 1 but also on the discharge current of the back-up capacitor 2 with the result that the current loading of the battery 1 is reduced and the drop of the battery voltage is limited to an uncritical amount.

Once the transmitter 5 has transmitted the data to be transmitted, it will be switched off by the control circuit 4. At the same time, the controllable switching unit 3 is returned by the control circuit 4 to its high-resistance condition so that the back-up capacitor 2 will not be recharged immediately so that no leakage current will occur at the back-up capacitor 2.

The back-up capacitor 2 need not necessarily be cut in before every transmitting operation; instead cutting in the back-up capacitor may be effected as required, for example by causing the control circuit 4 to evaluate the measured pressure values supplied by the pressure sensor 7, using the comparator 9, and to drive the switching unit 3 when the pressure is found to be below a predetermined limit value or when the pressure variation between two successive pressure measurements is found to exceed a predetermined limit value. A further criterion for determining if the back-up capacitor 2 is to be cut in or not may be provided by the further sensor 8 which may be a temperature sensor, for example. If the control circuit 4 determines with the aid of the comparator 9 that the temperature has dropped below a limit value, for example below −20° Celsius, then the control circuit 4 can drive the controllable switching unit 3, i.e. transfer it to its low-resistance condition, before the next transmitting operation. This procedure may be predetermined also for a given number of future transmitting operations.

The sensor 8 may also be a voltage sensor intended to measure the voltage of the battery 1. In this case, the control circuit 4 would cut in the back-up capacitor 2 in case it determines, using its comparator 9, that the battery voltage has dropped below a predetermined limit value. In doing so, the control circuit 4, using its integrated clock, is also in a position to know if the voltage of the unloaded battery 1 has been measured or the voltage of the battery 1 has been measured in loaded condition, namely during one of the preceding transmitting operations.

Finally, the control circuit 4, using the integrated timer 10, may determine the operating time of the entire circuit and, thus, a measure for the age of the battery 1, and may bring the back-up capacitor 2 into circuit for future transmitting operations once a predetermined age has been exceeded.

According to still another possibility the control circuit 4, using an integrated counter 11, counts the number of transmitting operations and, once a predetermined number of transmitting operations has been exceeded, brings the back-up capacitor 2 into circuit for future transmitting operations.

Figure 2:
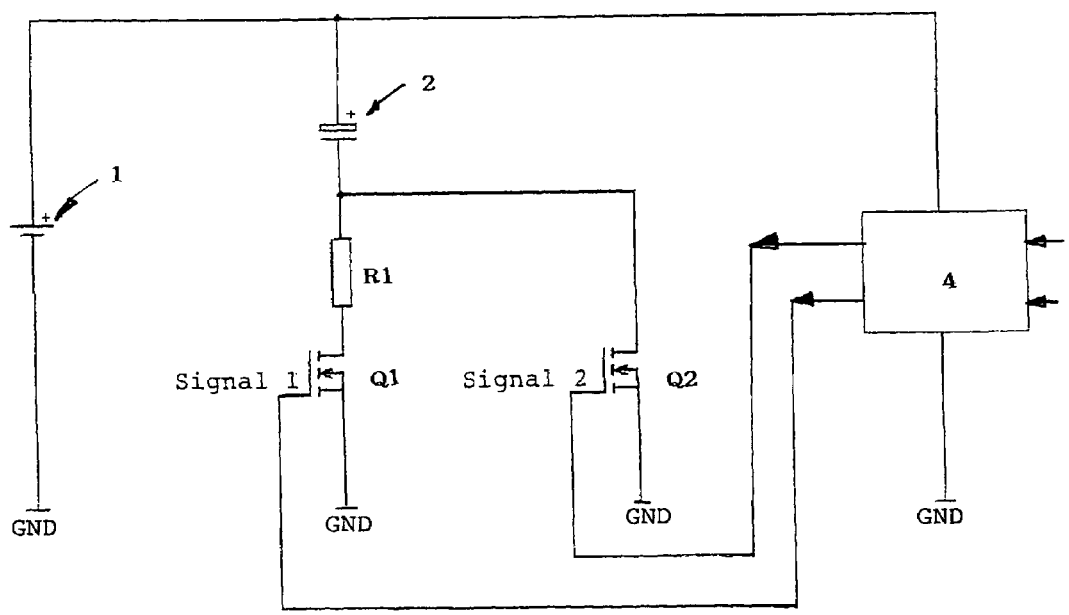
FIG. 2 shows part of the circuit arrangement of FIG. 1, illustrating the details of the switching unit 3.

FIG. 2 illustrates an example of a circuit arrangement of the controllable switching unit 3, which in the present case comprises a first MOSFET Q1, a second MOSFET Q2 and an ohmic resistor R1 effective as current limiter. The resistor R1 and the back-up capacitor 2 are connected in series with the MOSFET Q1. The MOSFET Q2 bridges the resistor R1 and the MOSFET Q1. Both MOSFETs are supplied with control signals from the control circuit 4. If a transmitting operation is to be initiated, a signal 1 is supplied to the MOSFET Q1 as control signal a short time before such activation, for transferring it from the high-resistance condition to a low-resistance condition. The back-up capacitor 2 is then charged by the battery 1, with the resistor R1 acting as current limiter and ensuring that the battery voltage will not drop to an undesirable extent during the charging operation. Using a signal 2, by which the control circuit 4 also activates the transmitter 5, the MOSFET Q2, which was still in its high-resistance condition during charging of the back-up capacitor 2, is transferred to its low-resistance condition. For supplying the transmitter 5, the back-up capacitor 2 can rapidly discharge without being hindered by a voltage drop across the resistor R1, and can thereby backup the battery voltage. Once the transmitter 5 has transmitted the desired data, it is switched off again by the control circuit 4. At the same time, the two MOSFETs Q1 and Q2 are transferred back to their high-resistance condition.

The example of a circuit shown in the drawing illustrates only one of several possible solutions by which the present invention can be implemented in practice.

LIST OF REFERENCE NUMERALS

1. Battery
2. Back-up capacitor
3. Switching unit
4. Control Circuit
5. Transmitter
6. Antenna
7. Pressure sensor
8. Sensor
9. Comparator
10. Timer
11. Counter

The invention claimed is:

1. Device for monitoring and wirelessly signaling a pressure, or a change in pressure, in pneumatic tires on vehicles comprising:
    a pressure sensor for measuring the pressure or the change in pressure;
    a transmitter for transmitting a signal derived from the measuring signal of the pressure sensor;
    a control circuit that activates the transmitter intermittently to submit said derived signal;
    a battery as current source;
    and a back-up capacitor connected in parallel to the battery; and
    wherein a controllable switching unit is provided which is so controlled such that the back-up capacitor is connected in parallel to the battery intermittently before the control circuit activates the transmitter and for a limited period of time during the transmitting operation of the transmitter.

2. The device as defined in claim 1, wherein the controllable switching unit has an input for control signals arriving from the control circuit by which the back-up capacitor is brought into the circuit from time to time for said limited period of time only.

3. The device as defined in claim 2, wherein the control circuit is arranged to bring the back-up capacitor into the circuit shortly before it activates the transmitter.

4. The device as defined in claim 1, wherein the control circuit is arranged to bring the back-up capacitor into the circuit shortly before it activates the transmitter.

5. The device as defined in claim 4, wherein the control circuit is arranged to activate the back-up capacitor every time shortly before it activates the transmitter.

6. The device as defined in claim 4, wherein the control circuit is arranged to activate the back-up capacitor not every time the transmitter is activated, but only if and when necessary.

7. The device as defined in claim 6, wherein the control circuit comprises a comparator.

8. The device as defined in claim 7, wherein the control circuit is connected to a device for measuring the voltage of the battery and is arranged such that it will determine that the need exists when the voltage of the battery has dropped below a given limit value.

9. The device as defined in claim 8, wherein the control circuit determines that the need exists when the voltage of the battery has been determined to be below its limit value in one or more preceding activations of the transmitter.

10. The device as defined in claim 7, wherein the control circuit is connected to a sensor and is arranged such that it will determine that the need exists when the measured value supplied by the sensor is below or above a given limit value.

11. The device as defined in claim 10, wherein the measured value is the temperature.

12. The device as defined in claim 7, wherein the control circuit is connected to a timer and is arranged such that it will determine that the need exists when a predetermined period of time has lapsed from the time the timer has been started.

13. The device as defined in claim 7, wherein the control circuit is connected to a counter, which continuously counts the number of the transmitting operations, and that the control circuit is arranged such that it will determine that the need exists when a predetermined number of transmitting operations has been exceeded.

14. The device as defined in claim 7, wherein the control circuit is arranged such that it will determine that the need exists when the pressure measured is determined to be below a given limit value.

15. The device as defined in claim 7, wherein the control circuit is arranged such that it will determine that the need exists when the variation in pressure over time exceeds a given limit value.

16. The device as defined in claim 6 wherein the transmitter is coupled back to the control circuit and that the control circuit is arranged such that it evaluates a signal transmitted from the sensor through the feedback system to determine any information indicating that an attempted transmission has failed and that the control circuit determines that a need exists to bring the back-up capacitor into the circuit by determining that an attempted transmission has failed.

17. The device as defined in claim 6, wherein the control circuit is arranged such that when a corresponding need has been determined to exist it will bring the back-up capacitor into circuit for a given number of transmitting operations and will then once more check the criterion or criteria that led to the determination that a corresponding need exists.

18. The device as defined in claim 1, wherein the switching unit comprises a current limiter through which the back-up capacitor is charged, but not discharged.

19. The device as defined in claim 18, wherein the switching unit comprises two switching elements controlled by the control circuit the first of which serves to cut in the back-up capacitor via the current limiter, while the second serves to bridge the current limiter.

20. The device as defined in claim 1, wherein the switching unit comprises as switching elements a field effect transistor.

* * * * *